(12) United States Patent
Lucy

(10) Patent No.: US 7,775,798 B2
(45) Date of Patent: Aug. 17, 2010

(54) EDUCATIONAL RESTAURANT AND TRAVEL GAME SYSTEM

(76) Inventor: Lucille A. Lucy, 123 Constitution Way, Basking Ridge, NJ (US) 07920

( * ) Notice: Subject to any disclaimer, the term of this patent is extended or adjusted under 35 U.S.C. 154(b) by 255 days.

(21) Appl. No.: 11/656,853

(22) Filed: Jan. 23, 2007

(65) Prior Publication Data

US 2008/0176193 A1   Jul. 24, 2008

(51) Int. Cl.
G09B 19/22 (2006.01)
(52) U.S. Cl. ........... 434/128; 434/129; 434/159; 434/258; 434/322
(58) Field of Classification Search ........ 434/129; 273/272
See application file for complete search history.

(56) References Cited

U.S. PATENT DOCUMENTS

| | | | |
|---|---|---|---|
| 2,635,360 A | | 4/1953 | Bishop ............... 434/172 |
| 2,881,546 A | * | 4/1959 | Gauthier ............. 428/39 |
| 3,143,348 A | | 8/1964 | Carsen et al. ......... 273/294 |
| 3,606,336 A | | 9/1971 | Karuse ............... 273/272 |
| 4,043,559 A | * | 8/1977 | Eigen et al. .......... 273/239 |
| 4,146,229 A | * | 3/1979 | Morse ................ 273/150 |
| 4,244,577 A | | 1/1981 | Poulos ............... 273/236 |
| 4,640,513 A | | 2/1987 | Montijo .............. 273/249 |
| 4,678,188 A | | 7/1987 | Johnson .............. 273/430 |
| 4,703,930 A | * | 11/1987 | Gilbert .............. 273/447 |
| 4,826,437 A | | 5/1989 | Havard ............... 434/167 |
| 5,310,061 A | | 5/1994 | Kanbar ............... 206/555 |
| 5,413,355 A | | 5/1995 | Gonzalez ............. 273/429 |
| 5,429,514 A | * | 7/1995 | Brinson .............. 434/172 |
| 5,501,602 A | * | 3/1996 | Anderson et al. ...... 434/263 |
| 5,507,495 A | * | 4/1996 | Kiss ................. 273/243 |
| 5,524,899 A | | 6/1996 | Haqedorn ............ 273/299 |
| 5,551,700 A | | 9/1996 | Druce et al. .......... 273/296 |
| 5,558,520 A | * | 9/1996 | Werzberger .......... 434/317 |
| 5,626,477 A | * | 5/1997 | Adkison .............. 434/128 |

(Continued)

FOREIGN PATENT DOCUMENTS

FR   2658428   2/1990

(Continued)

Primary Examiner—Gene Kim
Assistant Examiner—Joseph B Baldori
(74) Attorney, Agent, or Firm—Ernest D. Buff & Associates, LLC; Ernest D. Buff; Margaret A. LaCroix

(57) ABSTRACT

An educational restaurant and travel game system and method of use include a plurality of educational games each having a plurality of game pieces disposed in a game container. The game container is adapted to house the plurality of educational games and has a size and shape so that the game container is adapted for portability. A game book setting forth rules for each of the educational games, age ranges, number of players, list of items needed, a stated educational objective, and an educational goal is included within the container. Reading, math, fine motor skills, eye-hand coordination, memory enhancement and retention, and social skills games are included within the compact travel container. Playing the games of the educational restaurant and travel game system fosters an educational environment, while at the same time offers entertainment and quality family interaction. The game system finds use during travel and during moments of idle time for children, such as doctor's office and restaurant visits. Its entertaining and educational features further commend it for use in a home or school environment.

2 Claims, 2 Drawing Sheets

U.S. PATENT DOCUMENTS

| | | |
|---|---|---|
| D402,106 S | 12/1998 | Buckingham et al. ......... D3/284 |
| 5,941,526 A | 8/1999 | Martens et al. ............. 273/249 |
| 5,967,517 A * | 10/1999 | Villano ....................... 273/292 |
| 6,120,296 A | 9/2000 | Lim ............................ 434/128 |
| 6,234,481 B1 * | 5/2001 | Robertson ................... 273/243 |
| 6,234,486 B1 | 5/2001 | Wallice ....................... 273/299 |
| 6,290,230 B1 | 9/2001 | Anthony ..................... 273/447 |
| 6,367,799 B1 * | 4/2002 | Sippel ........................ 273/294 |
| 6,648,331 B2 | 11/2003 | Stuart ......................... 273/430 |
| 6,761,356 B1 | 7/2004 | Jacobson et al. ............. 273/292 |
| 7,000,920 B2 | 2/2006 | Camp et al. ................. 273/273 |
| 7,021,629 B1 | 4/2006 | McCabe ..................... 273/274 |
| 7,063,535 B2 * | 6/2006 | Stamm et al. ............... 434/236 |
| 2002/0043761 A1 | 4/2002 | Brecheen et al. ............ 274/243 |
| 2003/0038423 A1 | 2/2003 | Turner et al. ............ 273/157 R |
| 2005/0200078 A1 | 9/2005 | Montaldo ................... 273/243 |
| 2006/0119039 A1 * | 6/2006 | Reed et al. .................. 273/236 |
| 2007/0172798 A1 * | 7/2007 | Thomas ..................... 434/128 |
| 2008/0116632 A1 * | 5/2008 | Russell ................... 273/148 A |

FOREIGN PATENT DOCUMENTS

JP         6039080         2/1994

\* cited by examiner

EDUCATIONAL RESTAURANT AND TRAVEL GAME SYSTEM

BACKGROUND OF THE INVENTION

1. Field of the Invention

The present invention relates to a game that is compact and portable and can be played in restaurants or during travel for both entertainment and for educational purposes; and more particularly to an educational restaurant and travel game system having a plurality of educational games of varying subject matters housed within a compact portable container.

2. Description of the Prior Art

Games can be played for educational purposes to enhance children's various skills. Utilization of games which focus on particular subject matters provides a resourceful educational tool that is entertaining and can be socializing for children of different ages. Reading, memory, and math skills encompass subject matters many game devices typically cater towards. Conventional educational game devices are appointed to be played in the home or other like environments, and are not adapted to be played during travel or when families are out-of-home. As such, time spent during travel, doctor office visits, restaurants, and the other like out-of-home activities is spent idle, causing children to become bored and, at times, to act out. Even where travel games do exist, these games typically focus on improving a single subject matter, and fail to include a single travel container in which are disposed a plurality of games that focus on a plethora of subject matters.

Educational game devices of the conventional type generally involve game boards appointed to be played at home and include game board playing surfaces and various play pieces. For example, U.S. Pat. No. 2,635,360 to Bishop discloses an educational work board for practicing spelling, number work and the like, constructed with pockets appointed to accommodate cards. U.S. Pat. No. 3,606,336 to Krause discloses a word association game including a board having letters and numerals arranged circumferentially thereon about an axis, a pointer, and playing pieces. U.S. Pat. No. 4,244,577 to Poulos discloses a diagnostic memory skill game and method generally comprising game cards and a game board having a plurality of player areas. U.S. Pat. No. 4,640,513 to Montijo discloses a super memory educational game of skill and chance utilizing a circular game board wherein the players take turns trying to spell, pronounce and define words correctly, remember number sequences, and answer question cards.

Educational games utilizing game boards can also be found in the following: U.S. Pat. No. 6,120,296 to Lim discloses an educational board game having a play path that borders a central region geared towards educating children on how to remain safe in potentially-dangerous situations; U.S. Pat. No. 7,000,920 to Camp et al. discloses a memory engagement game including one or more game boards with openings, a plurality of game cards, and a plurality of calling cards; U.S. Patent Application Publication No. 2005/0200078 to Montaldo discloses an educational science game and method of play having a primary game board or universe with a plurality of spaces marked thereon; and Foreign Patent Publication No. FR 02658428 to Marmy discloses a game using a playing surface divided into square boxes arranged in lines and in columns, and provides numerical pieces bearing integers and operating pieces bearing mathematical or logic operators. U.S. Pat. No. 6,290,230 to Anthony discloses a table game for utilizing the sense of touch and memory including a container, three dimensional objects, playing cards having visual raised relief images and corresponding descriptive text, and a view illustrating the general manner in which the game device is used and wherein the play container is the central component of the game.

These aforementioned game board devices currently utilized for playing in the home are too cumbersome for play during travel. In addition, they are not small enough in size to facilitate compact storage and mobility, and do not possess designed-in compact capability with traveling storage containers. Often times educational game board devices require longer playtime to complete and are not practical for on-the-go play during short intervals, such as during time spent waiting at a doctor's office. All of these factors make conventional board games and educational game devices impractical for use during travel. Moreover, current educational game board devices typically only provide for a single game to be played over and over again, utilizing the given board and corresponding pieces. As such, these conventional educational game board devices only provide an educational tool that enhances the highly specific subject matter to which the board and pieces are geared.

Other educationally geared games provide cards appointed with various indicia for enhancing such skills as mathematics, reading, or the like. For example, U.S. Pat. No. 3,143,348 to Carsen et al. discloses a game wherein game cards are provided relating to a variety of subjects and each has a question and answer face side and an information back side. U.S. Pat. No. 6,234,486 to Wallice discloses a word-forming card game wherein players are dealt cards each having a letter thereupon for forming words. U.S. Pat. No. 4,826,437 to Havard discloses an educational game for teaching phonetics providing for the use of a deck of cards having at least one main card and a plurality of secondary cards. U.S. Pat. No. 5,310,061 to Kanbar discloses a word-puzzle game cartridge having a book format and being appointed for accommodating two decks of word-puzzle playing cards. U.S. Pat. No. 5,524,899 to Haqedorn discloses a multi-functional alphabet-card game with optional diamonoidal-cards, wherein two special playing-card deck stacks are provided for teaching the alphabet, matching of objects, counting, phonics, spelling, and training of memory. U.S. Pat. No. 5,551,700 to Druce et al. discloses playing cards divided by a line into two sections which may be printed in different colors and divided into suits, and wherein easy and hard questions are printed on each card together with their answers. U.S. Pat. No. 6,761,356 to Jacobson et al. discloses an educational card game including a card set containing a plurality of game cards, writing surfaces, a concealment folder, a timer, a multi-sided die, and a set of writing utensils and wherein the game challenges players to win points by verbally describing images. Foreign Patent No. JP 06039080 to Hatake discloses a set of game cards constituting card sets having different symbols thereon to enhance children's mathematical skills.

While educational card game devices, as hereinabove, provide a more practical type of traveling format, these games are generally not appointed for travel and do not include a traveling storage container adapted to house a plurality of games and game pieces. Like the board game devices, the card games provide for a single game to be played over and over again, utilizing given cards that only provide educational enhancement for a specific subject matter. The aforementioned board game and card game devices fail to provide a plurality of different games each especially suited to enhance a different subject matter and the plurality of games being housed within a single carrying travel case.

Even where current educational games are more predisposed towards playing during travel, these games fail to provide a plurality of games within a single travel container.

Significantly, these games fail to provide a plurality of games that are each independent of one another and are each geared towards improving different subject matter areas for children of various age groups. For example: U.S. Pat. No. 4,678,188 to Johnson discloses a question and answer game having a cube-like body provided with one or more question-carrying surfaces which are adapted to carry indicia in the form of questions of interest and advertising indicia; U.S. Pat. No. 5,413,355 to Gonzalez discloses an electronic educational game with responsive animation, wherein animated indicia is included represented by a character that moves or responds based upon whether the player gives a correct or incorrect answer; U.S. Pat. No. 5,941,526 to Martens et al. discloses a method of playing an educational game including a game board that is printed onto a conventional paper place mat wherein the board has a safety card positioning space and a sequence of counterclockwise oriented game piece spaces; U.S. Pat. No. 6,648,331 to Stuart discloses an educational interactive question and answer word deduction game that includes a circular information or playing card mounted in a generally semicircular sleeve with open areas and covered portions, wherein the playing card is rotated to reveal areas covered by the sleeve; U.S. Pat. No. 7,021,629 to McCabe discloses a word-forming game including twenty-eight playing pieces, each having a front surface with indicia thereon and adapted to face a single player, and a rear surface with indicia thereon for facing an opponent player, wherein the object of the game is to form as many words as possible from playing pieces; U.S. Patent Application Publication No. 2003/0038423 to Turner et al. discloses an educational toy/game having a box and having blocks with raised shapes thereon that fit into correspondingly shaped openings in the box; and U.S. Patent Application Publication No. 2002/0043761 to Brecheen et al. discloses an interactive education game and method in which players conduct a dinosaur expedition.

Other devices disclosed merely provide storage for game pieces. These containers do not provide a plethora of games, each of which assists in improving a different subject matter for children. For example, U.S. Design Pat. No. Des. 402,106 to Buckingham et al. discloses an ornamental design for a multiple game portable storage container providing multiple layers for storage of game pieces. However, the multiple game portable storage container does not provide multiple games therein intended to educate children in a plurality of subject matters. Rather, the container is merely adapted to house a plurality of game pieces, which would typically be required for a single game.

Notwithstanding the efforts of prior art workers to construct an educational game for providing improvement in various subject matters for children of varying ages, there remains a need in the art for an educational restaurant and travel game system utilized for travel and during moments of idle time for children, such as doctor's office and restaurant visits. In addition, there is a need in the art for an educational restaurant and travel game system that provides a plurality of educational games within a single compact container, and wherein each of the plurality of educational games is especially suited to improve different subject matter areas. Further, there is an art-recognized need for an educational restaurant and travel game system that includes a plurality of educational games including at least one reading game, math game, fine motor skills game, eye-hand coordination game, and memory enhancement and retention game and wherein each game includes a stated objective and an educational goal set forth for enhancing specific skills of each of the players.

SUMMARY OF THE INVENTION

The present invention provides an educational restaurant and travel game system tailored for use during travel and during moments of idle time for children, such as doctor's office and restaurant visits. It is both entertaining and educational and, as such, is well suited for use in a home or school environment. Portability is achieved by a compact travel container that is adapted to house a plurality of educational games. Each of the educational games is adapted to improve a subject matter area, with at least one reading game, math game, fine motor skills game, eye-hand coordination game, and memory enhancement and retention game. Stated objectives and educational goals are set forth for each game. Once the educational goals are met by a specific player, then the player is ready to move on to more advanced material, or move on to focus on another subject area. The educational restaurant and travel game system provides a plurality of educational games geared toward improving a plethora of subject areas while at the same time providing a fun-filled socially conducive atmosphere.

The educational restaurant and travel game system includes a plurality of educational games each having a plurality of game pieces disposed in a game container. The game container is appointed for housing the plurality of educational games and is constructed having a size and shape so that the game container is adapted for portability. Additionally, the educational restaurant and travel game system includes a game book setting forth rules for each of the educational games. The game book includes age ranges, number of players, a list of items needed, a stated educational objective, and an educational goal. The educational goal deals with the specific skills brought out by the players when playing each of the educational games so that strength and weaknesses can be identified and focused upon for advancement or improvement, respectively. Preferably, the plurality of educational games of the educational restaurant and travel game system comprise at least one reading game, math game, fine motor skills game, eye-hand coordination game, and memory enhancement and retention game.

In another embodiment the educational restaurant and travel game system includes a plurality of educational games each having a plurality of game pieces, wherein the educational games include at least two reading games and at least two math games. The plurality of games is housed within a game container having a size adapted for portability. A game book is provided setting forth rules for each of the plurality of educational games. The game book includes age ranges, number of players, a list of items needed, a stated educational objective, and an educational goal. The educational goal is designed to enhance the specific skills of each player when playing a specific one of the educational games.

Further provided in accordance with the invention is a method of using an educational restaurant and travel game system. Generally stated, the method comprises the first step of selecting at least one educational game from a plurality of educational games, each of the games having a plurality of game pieces located within a game container and being focused on a given subject matter. The container is adapted to house the plurality of educational games, and is adapted to have a size and shape conducive to portability. The method also comprises reading a game book that sets forth rules for the selected educational game. The game book includes age ranges, number of players, a list of items needed, a stated educational objective, and an educational goal for enhancing the specific skills of each player when playing each educational game. The skill level of each player is determined so that the level of a selected game can be matched with the skill levels of the players. Next, the items to the selected game are placed according to the rules set forth in the game book. The educational game is played and the improvement of the given subject matter for each of the players is monitored and measured.

BRIEF DESCRIPTION OF THE DRAWINGS

The invention will be more fully understood and further advantages will become apparent when reference is had to the following detailed description of the preferred embodiments of the invention and the accompanying drawings, in which.

DETAILED DESCRIPTION OF THE INVENTION

Figure 1:
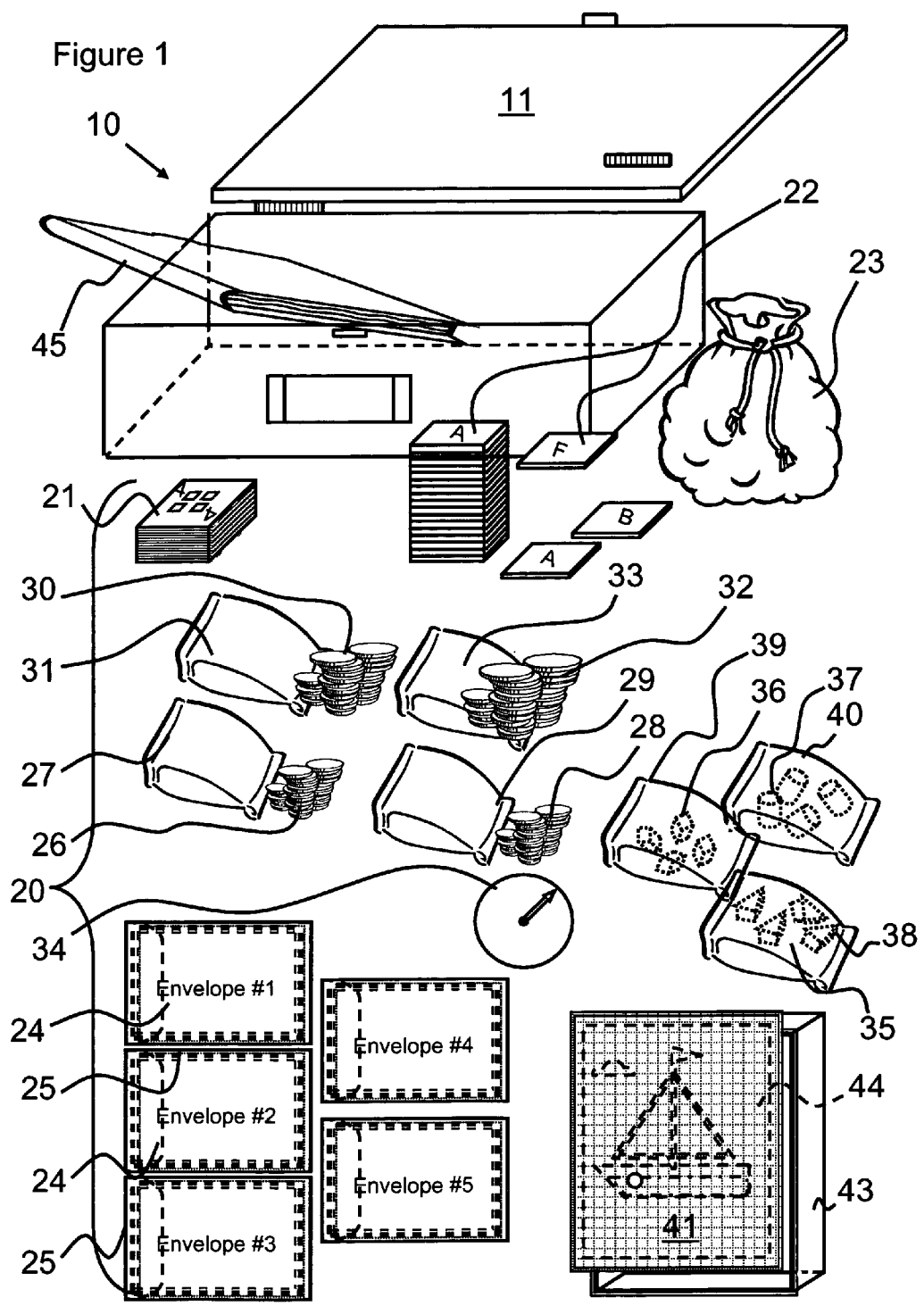
FIG. 1 illustrates an embodiment of the educational restaurant and travel game system, showing a plurality of educational games housed within a compact portable container.

The present invention presents a game system that is both entertaining and educational by providing an educational restaurant and travel game system that utilizes a plurality of games within a compact, portable container. The educational restaurant and travel game system imparts a series of games for teaching children in a plethora of skill areas. Reading, math, fine motor skills, eye-hand coordination, memory enhancement and retention, and social skills games are included within the compact travel container. Each educational game sets forth a specific age range for the players, as well as a set number of players. Playing the games of the educational restaurant and travel game system fosters an educational environment, while at the same time offers entertainment and quality family interaction. Stated objectives are included for each of the games in the form of an educational objective appointed to develop or improve skills of each of the players. Items necessary to play each of the games are listed, and directions are provided within the container for playing each of the educational games. Such items may include such playing tools as cards, letter tiles, letter, word, number or picture cards, letter, word, number or picture charts, dice, dominoes, design pegs and shapes, stencils. Educational goals are provided for each game so that parents can choose specific games that are geared to addressing their child's weaknesses. When a child's skills increase and the child is ready to move on to more advanced subject matter, the games of the educational restaurant and travel game system are replaced by games geared to a more advanced level.

Family interaction and learning are encouraged in a fun manner. At the same time, children can be readily entertained in public places or during travel where children can have a tendency to become bored during extended wait periods. Suggested uses include home use, restaurant use, doctors' offices, travel use, and anywhere children need to be engaged in an activity to stave off boredom. The games of the educational restaurant and travel game system have been designed to develop many areas of academic skills as well as social skills by focusing on specific aspects of a plethora of subject areas, including: (a) Reading: letter recognition—capital and lower case letters; writing letters with correct formation; alphabetical order directionality; letter sounds; beginning sounds of words; spelling words; visual discrimination building vocabulary categorizing; story sequencing story predicting; asking questions; and expressive language; (b) Math: number recognition; number order; writing numbers with correct formation; counting 1 to 100; counting by 2s, 5s and 10s; distinguishing which number is more or less; learning what comes after, before or is in between other numbers; distinguishing larger/higher, smaller/lower numbers; distinguishing odd and even numbers; recognizing shapes; addition—easy methods for understanding; subtraction—easy methods for understanding; learning number facts for addition and subtraction; ordinal numbers—first, second, third, etc., last; word problems (number stories) with manipulatives; making their own number stories; patterns and using imagination; and money—recognition, value, combination of coins; (c) Fine Motor Skills—Using small muscles of hands in playing all games; (d) Eye-Hand Coordination; (e) Memory Enhancement and Retention; and (f) Social Skills: building self esteem; encourage expressive language; learning to take turns; sharing; following directions; enhance interaction with family and friends. There may be one educational game concerning each subject matter per container, or preferably there may be a plurality of educational games for each subject matter in one container. Occasionally, a single game may include more than one subject matter area.

FIG. 1 illustrates an embodiment of the educational restaurant and travel game system, showing a plurality of educational games housed within a compact portable container, shown generally at 10. The educational restaurant and travel game system 10 includes a plurality of educational games 20 each having a plurality of game pieces disposed in a game container 1. Game container 11 is appointed for housing the plurality of educational games 20 and is constructed having a size and shape so that game container 11 is adapted for portability. Game container 11 has a width ranging between 3 to 10 inches, a length ranging between 6 to 12 inches, and a height ranging between 2 to 6 inches. Preferably, game container 11 has the following dimensions: a width of six inches, a length of nine inches, and a height of three inches. The container is preferably composed of a durable plastic flip-top box (resembling a pencil holder) for convenient lightweight storage, packing and traveling of the educational games housed therein.

The educational restaurant and travel game system 10 includes a game book 45 setting forth rules for each of the educational games 20. The game book includes age ranges, number of players, a list of items needed, a stated educational objective, and an educational goal. The educational goal deals with the specific skills brought out by the players when playing each of the educational games 20 so that strengths and weaknesses can be identified and focused upon for advancement or improvement, respectively. The age range for each educational game 20 may range from player ages three to ten. Preferably, the age range for each educational game 20 ranges from player ages three to seven.

Educational games 20 includes a plurality of game pieces and preferably comprise at least one reading game, math game, fine motor skills game, eye-hand coordination game, and memory enhancement and retention game. Container 11 houses educational games 20, and in FIG. 1 the educational games include the following [for game examples, see Examples 1-5 hereinbelow]: (i) a math card game challenge including a deck of mathematical cards 21; (ii) a reading game, emphasizing a letter match game, hereinafter ABC match game, including two sets of square cards 22 with letters thereupon and a bag 23 with a drawstring; (iii) a memory game utilizing numbers, including two identical sets of numbers on memory number cards 24 with number ranges thereon, herein shown as five ranges, housed within five range envelopes 25; (iv) a money game with spinner for teaching coin recognition and develop fine motor skills by using small muscles in hands, including plastic replicas of coins with re-closable coin bags, including: pennies 26 in re-closable coin bag 27; nickels 28 in re-closable coin bag 29; dimes 30 in re-closable coin bag 31; and quarters 32 in re-closable coin bag 33. A spinner 34 is also provided; and (v) a game for teaching shape recognition, eye-hand coordination, and visual perception, including wooden triangle pegs 35, square pegs 36, and circular pegs 37 housed in re-closable peg bags 38, 39, and 40, respectively. In addition, the game includes a rectangular plastic grid 41 with holes appointed to receive pegs 35, 36, and 37 and adapted to be placed in a tray 43. A design template 44 with a design/picture thereon is placed beneath grid 41 and pegs 35, 36, and 37 are placed into the holes of grid 41 corresponding to shape and color on the fill-in design/picture on template 44.

The educational restaurant and travel game system may further comprise replacement games to replace each of the games 20 after the educational goal for each of the players is achieved. Preferably, game replacement is done by way of a kit having at least one at least one reading game, math game, fine motor skills game, eye-hand coordination game, and memory enhancement and retention game therein. The educational restaurant and travel game system is appointed to be utilized in travel environments, and is also appointed to be utilized in a school environment. When used in a school environment, the game further comprises level ranking means where a game level ranking is designated for each game, and a player level is given to each player. Players having similar player levels play together and are matched with the corresponding game level ranking.

Each educational game has an age range for each player set forth. Educational objectives further comprise an educational objective appointed to develop or enhance specific skills of each of the players. Items and directions are provided along with educational goals for enhancing the specific skills of each of the players. Educational goals are set forth so that parents can focus on improving a given skill area of a child until the child is ready to advance to another educational goal. Examples of games utilized by the Educational Restaurant and Travel Game System are set forth hereinbelow, and generally correspond to the educational game challenges shown in FIG. 1 discussed hereinabove.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLES

Example 1

Math Card Game Challenge Including a Deck of Mathematical Cards 21

Age—3-7
Number of Players—2-6
Objective—a math game for number recognition, adding and subtracting.
Items needed—a deck of cards numbered 0 to 10 in six colors (red, yellow, blue, orange, green, purple) with little squares in the middle of the card to go with the corresponding number of the card (cards are the size and shape of regular playing cards).
Directions—Choose first player by highest card drawn. Cards dealt until all cards are distributed, each player keeps their cards in a face down pile in front of them. Start clockwise from first player and place one card in center of table, each player saying the name of the number of their card. If the player does not know the number, the adult will have him or her repeat the number after it is identified. Player with highest card wins the round, and makes a separate pile with the cards won (this is the winning pile) next to original playing pile, except face up. If there is a duplicate of numbers placed on the table, those players place three cards face down on their thrown card and then put the fourth card face up. Whoever has the highest number wins the round, and takes all the cards of that round. Continue the same procedure until all cards dealt to the players are used. Player with the most cards (in their winning pile) at the end of the game is the winner.

Directions for Addition: Follow directions above, except each player places two cards down on table and says the number fact with the sum included. Example: 2+3 =5. Whoever has the Number Fact with the highest sum wins the round. If duplicate number facts or a different number fact with the same sum comes up, those players place three cards face down on their thrown card and then put two face up to see who has the highest sum to win the round. Winner takes all the cards of that round. If child has difficulty adding, tell him or her to look at the little squares on the lowest number card and "count on" from the largest card number (Example: 6+2=8, 6 is the largest card number and then pointing at each of the little squares on the lowest number card, "count on" 6 (the highest number card), 7, 8. 6+2=8. Another Example: 9+4=13. The largest card number is 9. Point to the squares on the lowest number card and "count on" starting with highest number card, 9, 10, 11, 12, 13. 9+4=13.

Directions For Subtraction: Play same as in addition, except the winner is the one with the highest number for the difference between his or her two cards. If child has difficulty subtracting, tell him or her to look at the little squares on the lowest number card and "count backwards" from the largest card number. Example: 6−2=4. 6 is the largest card number, pointing at the little squares on the lowest number card "count back," 6, 5, 4: 6−2 =4. Another Example: 9−4=5. Say 9 (the highest number card), "count back" from 9 pointing at the little squares of the lowest number card, 8, 7, 6, 5. 9−4=5.

Educational Goal—reinforce number recognition, which number is more or less, and addition and subtraction number facts; to develop fine motor skills by using small muscles in hands, to encourage the child's expressive language, to build self esteem, to enhance interaction between adult and child, and accomplishing this, simply by HAVING FUN playing games with family and friends.

Example 2

Reading Game, Emphasizing a Letter Match Game, hereinafter ABC Match Game, Including Two Sets of Square Cards 22 with Letters Thereupon and a Bag 23 with a Drawstring Age: 3-6;
Number of Players: 2-4;
Objective: Match capital letters of the alphabet;
Items needed: two sets of ABCs, capitals only, (like a set of cards but square and thicker), using six different colors for the letters on a white background. A bag with a drawstring;
Directions: (1) Put one deck of cards in alphabetical order in a line on the table saying the name and having the child or children repeat it after adult. Put the other deck of cards (in random order) in the drawstring bag and shake bag. Each person gets a turn to pull out a letter, say the name or repeat after adult if they don't know and place it on the corresponding letter that is in alphabetical order. (2) Another way to use these cards is to put both decks out, face up, mix them up. Each person gets a turn to find matching letters and saying the letter name out loud or repeating it after the adult tells them the name of the letter. (3) Game version with scorekeeping to determine winner: Put both decks of cards out, face up. Mix them up. Starting at the same time all players begin to match cards into pairs until all cards are used. Point system is as follows: two points for a match if items can be identified/named by the player, one point for a match if player needs assistance identifying/naming items of the match. Whoever has the most points is the winner.

Educational Objective: Reinforce capital letter recognition, alphabetical order, color recognition and counting; to develop fine motor skills by using small muscles in hands, to encourage the child's expressive language, to build self esteem, to enhance interaction between adult and child, and accomplishing this, simply by HAVING FUN playing games with family and friends.

Example 3

Memory Game Utilizing Numbers, Including Two Identical Sets of Numbers on Memory Number Cards 24 with Number Ranges thereon, Housed within Envelopes 25

Age: 3-7;

Number of Players: Play in groups of two players to an envelope;

Objective: Matching numbers and developing memory skills;

Items Needed: Two identical sets of numbers that are two-inch square cardboard cards placed in separate envelopes as follows: Envelopes have number ranges appointed to provide cards therein, the ranges vary. Envelope 1: 0 through 5, Envelope 2: 6 through 11, Envelope 3: 12 through 17, Envelope 4: 18 through 23, and Envelope 5: 24 through 29. Dots will be placed on the bottom of the back of each memory card. The dots indicate the correct positioning of the face side so that when it is turned over the item is properly viewed.

Directions: Use one envelope at a time. Place cards face down on the table and mix around. Place cards in three rows of four cards still face down. Decide on who will be the first player. First player turns two cards face up and names the number on each card. If child does not know number, the adult will have him/her repeat the number name after it is identified. If it is a match, player keeps the cards in front of him/her. If it is not a match, turn cards back over leaving them in the same place. If it is a match, player gets another turn to choose two different cards to try to make another match. If it is not a match, the other person has a turn. Continue same procedure until all cards are matched. The one with the most matches is the winner.

Educational Goal: Reinforce number recognition 0 through 29 and develop memory skills, to develop fine motor skills by using small muscles in hands, to encourage the child's expressive language, to build self esteem, to enhance interaction between adult and child, and accomplishing this, simply by HAVING FUN playing games with family and friends.

Example 4

Money Game with Spinner for Teaching Coin Recognition and Develop Fine Motor Skills by Using Small Muscles in Hands, Including Plastic Replicas of Coins with Re-Closable Coin Bags, Including: Pennies 26 in Re-Closable Coin Bag 27; Nickels 28 in Re-Closable Coin Bag 29; Dimes 30 in Re-Closable Coin Bag 31; and Quarters 32 in Re-Closable Coin Bag 33. A Spinner 34 is Also Provided Ages: 3-7;

Number of Players: 2-4;

Objective: Recognizing coins, learning coin names and their values. Learning combination of coins needed for a specific value, and counting money.

Items Needed: 40 plastic replicas of each coin in separate re-closeable bags: pennies, nickels, dimes and quarters. A spinner to designate how much money player will be using. A chart of coins showing both sides of coins with names and values.

Directions: Put all coins in the middle of the table (this will be referred to as the middle pile.) Discuss chart: names of coins and values. Each player takes two dollars from the middle pile, five quarters, four dimes, four nickels, fifteen pennies. Choose who will be first by spinning the spinner to see who gets the largest value coin. First player spins spinner to see what he/she has to do (example: player may spin to take 35 cents from the middle pile and add to his/her pile, or the player may spin to put 15 cents into the middle pile from his/her pile). Player reads out loud what spinner points to and also counts money out loud as to what he/she has to do. Adult is encouraged to assist when necessary in adding money and using the chart. Go around in clockwise order and continue playing in the same manner. Give each player eight turns to spin the spinner as a full game, or until a player loses all of his/her money. Each player counts the amount of money he or she has accumulated. Adults are encouraged to assist children with counting out loud so they will become familiar with the process of counting money. Use chart whenever needed. Whoever has the most amount of money is the winner.

Educational Goal: Reinforcing coin recognition, learning names and value of coins, learning to count money, to develop fine motor skills by using small muscles in hands, to encourage the child's expressive language, to build self esteem, to enhance interaction between adult and child, and accomplishing this simply by HAVING FUN playing games with family and friends.

Example 5

Shape Recognition Game, Eye-Hand Coordination, and Visual Perception, Including Wooden Pegs Appointed to be Placed in a Grid to Form a Design/Picture Age: 3-6;

Number of Players: 1 or 2 players working together to make a design;

Items needed: Wooden triangle, square, and circle pegs. For each shape there will be twenty of the following colors: red, yellow, blue and green. All pegs housed in a re-closable bag. One rectangular plastic grid with square holes that will fit into the game box. A tray just large enough for the grid to fit into, with half-inch high sides. Various design/picture sheets.

Objective: To make designs according to a specific pattern.

Directions: Choose a design/picture sheet and put it into the plastic tray provided. Place grid over design sheet in tray. Empty bag of pegs into game box for easy handling. One player or two players working together to complete a design by filling in all the colored spaces of the grid with the proper colors and shapes.

Education Goal: To reinforce recognition of shapes and colors, develop eye hand coordination, develop visual perception; to develop fine motor skills by using small muscles in hands, to encourage the child's expressive language, to build self esteem, to enhance interaction between adult and child, and accomplishing this, simply by HAVING FUN playing games with family and friends.

Figure 2:
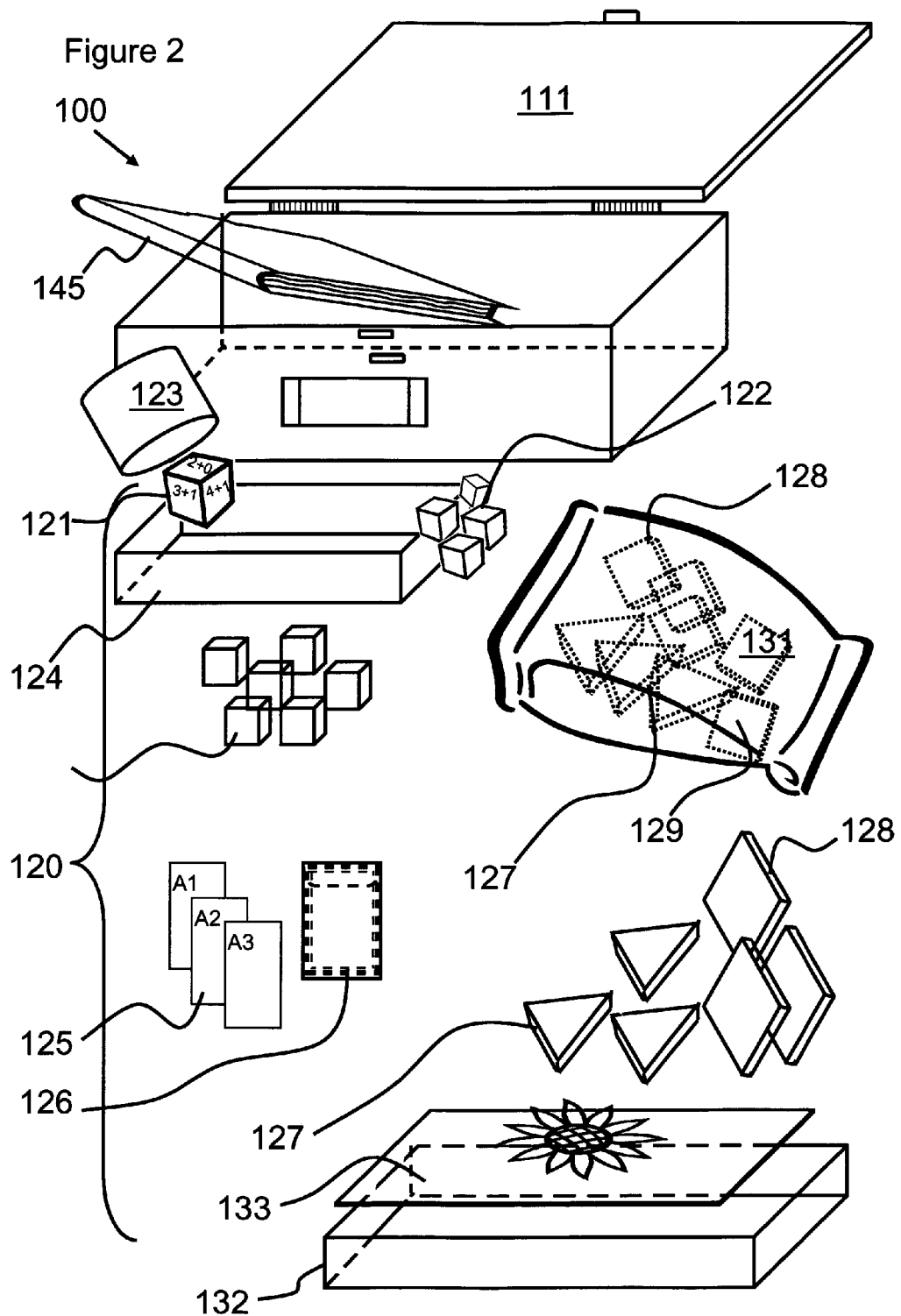
FIG. 2 illustrates another embodiment of the educational restaurant and travel game system, showing a plurality of educational games housed within a compact portable container.

FIG. 2 illustrates another embodiment of the educational restaurant and travel game system, showing a plurality of educational games housed within a compact portable container, shown generally at 100. In this embodiment, the educational restaurant and travel game system 100 includes plurality of game pieces 120 comprising at least seven numerical dice having mathematical indicia thereon, at least 20 cubes, at least four sets of story time cards each appointed within an envelope, and a plurality of shapes appointed to be placed within a shape tray upon a picture grid in order to create a picture with the shapes. Educational games 120 are housed within compact portable container 111. Game container 111 is appointed for housing the plurality of educational games 120 and is constructed having a size and shape so that game container 111 is adapted for portability.

The educational restaurant and travel game system 100 includes a game book 145 setting forth rules for each of the educational games 120. The game book includes age ranges, number of players, a list of items needed, a stated educational objective, and an educational goal. The educational goal deals with the specific skills brought out by the players when playing each of the educational games 120 so that strengths and weaknesses can be identified and focused upon for advancement or improvement, respectively.

Educational games 120 includes a plurality of game pieces and preferably comprise at least one reading game, math game, fine motor skills game, eye-hand coordination game, and memory enhancement and retention game. Container 111 houses educational games 120, and in FIG. 2 the educational games include the following [for game examples, see Examples 6-8 hereinbelow]: (vi) a math game utilizing blocks including at least seven dice that are one inch cubed with addition equations thereon (one of which dice 121 is tossed from a dice holder 123) at least 20 cube blocks 122 in different colors, dice holder 123, and a tray 124; (vii) a reading game, emphasizing picture story by way of story sequence cards, including a number of individual picture stories on laminated story cards 125, with separate story envelopes 126—as shown the story cards 125 involve stories continuing on three story cards 125; and (viii) a shape recognition game, eye-hand coordination game, via designing with wood shapes, including a plurality of the following shapes in an array of colors: triangles 127, diamonds 128 and squares 129, all housed in a re-closable bag 131 and further including a tray 132 appointed to receive a design/picture print 133.

Example 6

Math Game Utilizing Blocks Including at Least Seven Dice 121 that are One Inch Cubed with Addition Equations thereon, at Least 20 Cube Blocks 122 in Different Colors, a Dice Holder 123, and a Tray 124

Age: 3-7;

Number of Players: 2-4;

Objective: a math game for addition, remembering addition number facts;

Items Needed—Seven dice that are one and one-half inch cubed. Written on each side is one of the following: 4+1, 3+2, 2+0, etc. One die is used at a time. There are other dice that have different combinations of numbers to form a sum up to the number 18 (See list below of each die combination). 150 ½" cube blocks in six different colors. A die holder for rolling dice. A tray 5×8 with sides an inch high (a tray that will fit in on game box) to be used when the dice are thrown from the die holder. Additional four die: One die with the following addition: 1+0, 2+0, 3+0, 4+0, 6+0, 9+0. One die with the following addition: 2+1, 3+1, 5+1, 7+1, 8+1, 9+1. One die with the following addition: 1+2, 2+2, 3+2, 5+2, 6+2, 8+2. One die with the following addition: 2+3, 3+3, 6+3, 4+3, 5+3, 7+3. These four die will be put in a separate closable container marked for beginners in addition. All other die are for intermediate and advanced levels of addition.

| Die 1 | Die 2 | Die 3 | Die 4 | Die 5 | Die 6 | Die 7 |
| --- | --- | --- | --- | --- | --- | --- |
| 1 + 3 | 1 + 4 | 1 + 7 | 1 + 6 | 1 + 1 | 5 + 9 | 7 + 9 |
| 2 + 4 | 2 + 5 | 2 + 9 | 9 + 9 | 8 + 9 | 4 + 8 | 4 + 9 |
| 3 + 6 | 3 + 3 | 8 + 8 | 2 + 2 | 7 + 8 | 3 + 7 | 3 + 8 |
| 4 + 5 | 4 + 6 | 3 + 4 | 5 + 6 | 4 + 4 | 2 + 0 | 2 + 7 |
| 5 + 8 | 5 + 7 | 5 + 0 | 3 + 5 | 3 + 0 | 6 + 6 | 1 + 8 |
| 6 + 7 | 6 + 9 | 4 + 7 | 6 + 8 | 6 + 8 | 2 + 8 | 4 + 0 |

Directions: Choose first player by rolling die (use die holder and roll into tray provided) to see who has the highest sum. Put cube blocks in center of table. Roll one die and take the number of blocks from the pile in center of table that is the sum of the addition combination on the die that is rolled. Say equation out loud, Example: 2+4=6. Pass die to next player in clockwise order. Change off the die you use to roll to have different number facts involved in game. Play until all blocks are taken from the pile in center of table. Each player lines his/her blocks in rows of tens for easy counting. Whoever has the most blocks is the winner;

Educational Goal: To reinforce addition number facts, color recognition, counting skills and counting by tens, to develop fine motor skills by using small muscles in hands, to encourage the child's expressive language, to build self esteem, to enhance interaction between adult and child, and accomplishing this, simply by HAVING FUN playing games with family and friends.

Example 7

Reading Game, Emphasizing Picture Story by Way of Story Sequence Cards, Including a Number of Individual Picture Stories on Laminated Story Cards 125, with Separate Story Envelopes 126—as Shown the Story Cards 125 Involve Stories Continuing on Three Story Cards 125

Age 3-6;
Number of Players: 2-4;
Items Needed: A number of individual picture stories on 2×3 laminated cards. One timer. Each story will have at least two-card picture story series, herein the game has three-card picture story series. Each story in separate envelopes. Labels will be on back of each picture card for convenience, (Example: A1—first picture in story A, A2 —second picture in story A, etc.).
Three-card picture stories
A. 1. Seed in hole; 2. hole covered and child watering; 3. sprout growing.
B. 1. Bird making a nest; 2. eggs in nest; 3. baby birds in nest.
C. 1. Mixing cake batter in bowl; 2. pouring batter into a pan; 3. putting pan in oven.
D. 1. Child pushing cart in grocery store with parent; 2. in store with food in cart; 3. cart full of food at checkout counter.
E. 1. Child walks into pool area; 2. child stands at edge of pool; 3. child in pool.
F. 1. Children at party sitting around table; 2. cake brought in with candles lit; 3. cake on table with candles blown out.
Directions: Choose one individual picture story. Place on table in random order and have the child look at the pictures. Ask the following questions:
"What is the story about?"
"What is happening in each picture card?"
"What happens first?"
"What happens next?"
"What happens last?"
Child puts cards in proper sequence to tell a story. Put completed story cards in proper envelope and put into game box and choose another picture story and continue in same manner.
Game version with scorekeeping to determine winner: Story packets are placed in the middle of the table in a pile. Start the timer. Players choose one story packet at a time. Put cards on the table in front of him/her in proper sequence to tell a story. When first packet is completed choose another story packet and again put cards on table under the first story he/she completed in proper sequence to tell a story. Continue in this manner until timer goes off or all story packets have been used.
Point system as follows: 2 points for each story in proper story sequence and can be explained by player. 1 point if story is in proper story sequence and player needs assistance in explaining story. 0 points if story is NOT in proper sequence (proper sequence can be checked on the back of each picture story card.) Whoever has the most points is the winner.
Educational Goal: Recognizing story from pictures, verbalizing story, putting story in correct sequence, to develop fine motor skills by using small muscles in hands, to encourage the child's expressive language, to build self esteem, to enhance interaction between adult and child, and accomplishing this, simply by HAVING FUN playing games with family and friends.

Example 8

Shape Recognition and Eye-Hand Coordination, Via Designing with Wood Shapes, Including a Plurality of the Following Shapes in an Array of Colors: Triangles 127, Diamonds 128 and Squares 129, all Housed in a Re-Closable Bag 131 and Further Including a Shape Tray 132 Appointed to Receive a Design/Picture Print 133

Age: 3-6;
Number of Players: 1 or 2 players working together to make a design;
Items needed: Various numbers of plastic triangles, diamonds and squares in red, yellow, blue, orange, green and purple. All shapes housed in a re-closable bag. A tray just large enough to fit into the game box with half-inch high sides. Various design/picture prints.
Objective: To make designs according to a specific pattern.
Directions: Choose a design/picture print and put it into the plastic tray provided. Empty bag of shapes into game box for easy handling. One player or two players working together to complete a design by filling in all the colored shapes of the design pattern with the proper colors and shapes.
Education Goal: To reinforce recognition of shapes and colors, develop eye hand coordination, develop visual perception; to develop fine motor skills by using small muscles in hands, Design with Large Wood Shapes to encourage the child's expressive language, to build self esteem, to enhance interaction between adult and child, and accomplishing this, simply by HAVING FUN playing games with family and friends.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An educational restaurant and travel game system, comprising:
a. a plurality of educational games each having a plurality of game pieces;
b. a game container appointed for housing said plurality of educational games, wherein said game container is appointed to have a size and shape so that said game container is adapted for portability, and said game container has a width ranging between 3 to 10 inches, a length ranging between 6 to 12 inches and a height ranging between 2 to 6 inches;
c. a game book setting forth rules for each of said plurality of educational games, said game book including age ranges, number of players, a list of items needed, a stated educational objective, and an educational goal set forth for enhancing said specific skills of each player when playing each of said educational games;
d. said plurality of educational games comprise at least one reading game, math game, fine motor skills game, eye-hand coordination game, and memory enhancement and retention game;
e. said plurality of game pieces comprise at least one set of numerical cards having mathematical indicia thereon, at least one set of letter cards having letters thereon, at least one pouch for housing said letter cards, at least one spinner, at least one set of coins and at least one corresponding coin bag for each of said set of coins, at least one set of pegs appointed with a shape thereon, a grid and container combination with at least one design/picture sheet having a drawing thereon;

f. replacement games to replace each of said plurality of games after said educational goal for each of said players is achieved, said replacement games comprises a kit having at least one reading game, math game, fine motor skills game, eye-hand coordination game, and memory enhancement and retention game; and g. replacement games to replace each of said plurality of games after said player enters a new age range, said replacement games comprise a kit based on age having at least one reading game, math game, fine motor skills game, eye-hand coordination game, and memory enhancement and retention game.

2. An educational restaurant and travel game system as recited by claim 1, wherein said plurality of educational games comprises at least two reading games and at least two math games.

* * * * *